June 28, 1966 S. H. SCHWARTZ 3,258,202
GAS BURNER SAFETY VALVE
Filed Feb. 13, 1964

INVENTOR
SAMUEL H. SCHWARTZ

ATTORNEYS

United States Patent Office 3,258,202
Patented June 28, 1966

3,258,202
GAS BURNER SAFETY VALVE
Samuel H. Schwartz, Deerfield, Ill., assignor to The Dole Valve Company, Morton Grove, Ill., a corporation of Illinois
Filed Feb. 13, 1964, Ser. No. 344,571
2 Claims. (Cl. 236—99)

This invention relates generally to heat indicating devices and more particularly relates to a temperature-sensitive and temperature measuring device which is also movable in response to temperature variations for utilization in the control of associated apparatus, the operation of which is preferably a function of temperature such as, for example, an automatic gas burner valve.

Briefly, the instant invention incorporates some of the characteristics of a conventional Bourdon-spring fluid pressure gage, which is essentially a mechanical fluid pressure-measuring instrument employing as its sensing element a curved tube, preferably metallic and flattened in cross-section. In a conventional Bourdon gage one end of the tube is closed and the fluid pressure to be measured is applied through the other end. As the pressure is increased, the curved tube becomes more nearly circular in cross-section and tends to straighten. The motion of the tip or the free (closed) end of the tube is a measure of the internal pressure and is proportional to the fluid pressure applied to the tube.

In the instant invention, the above properties of a conventional Bourdon tube have been utilized in a novel and unique manner to provide a heat indicating device comprising a free end movable in proportion to heat applied to the device. A curved, flattened tube in the nature of a conventional Bourdon tube is conjoined with a straight length of tube having a circular cross-section. The entire tube element, including the curved portion and the straight portion, is filled with a thermally expansible material such as mercury, wax, ethylene glycol or the like, and both ends of the tube are closed and sealed. As a consequence the element is completely self-contained. Variations in temperature ambient the tube will cause changes in the volume of the expansible filler material and thereby vary the internal pressure within the tube with a concomitant movement of the free end of the tube.

The present invention finds utilization in a number of applications including, among others, a heat indicating device, a temperature measuring device, an operating control device and a safety control device, the operation of which is a function of temperature. For example, the invention may be advantageously utilized as a safety control element in an automatic gas burner valve, wherein the main gas valve can be closed by the movement of the free end of the tube in the event that the pilot light for the main burner should expire.

It is, therefore, an object of the present invention to provide improved means for indicating temperature.

Another object of the present invention is to provide a completely self-contained control apparatus adapted to movably actuate associated apparatus in response to variations in temperature.

Yet another object of the present invention is to provide a temperature responsive device which is characterized as employing a curved flattened tube in the nature of a fluid pressure-measuring Bourdon tube which tends to straighten upon an increase in the internal pressure thereof, but which is closed at both ends and filled with a thermally expansible material thereby providing a completely self-contained temperature measuring device.

Another object of the present invention is to provide a thermal actuating mechanism comprising a sealed hollow container constructed of a wall material being substantially inexpansible in response to pressure variations within the container but being somewhat resilient, and a thermally expansible material filling the container, in which the container is shaped such that the internal volume thereof in a free state configuration when said thermally expansible material is at a reduced temperature is less than the internal volume thereof when deformed to a pressurized state configuration when the temperature of the expansible material is increased, whereby the configuration of the mechanism is a function of the temperature applied thereto.

Still another object of the present invention is to provide a temperature-sensitive control device particularly suitable for use as a safety device in the control of apparatus, the operation of which is intended to be a function of temperature.

Another object of the present invention is to provide a flame sensor device which can be advantageously incorporated into an automatic gas burner valve assembly to close the main gas valve upon expiration of its associated pilot light.

Many other features, advantages and additional objects of the present invention will become manifest to those versed in the art upon making reference to the detailed description which follows and the accompanying drawings, in which preferred structural embodiments incorporating the principles of the present invention are shown by way of illustrative example only.

*On the drawings*

Figure 1:
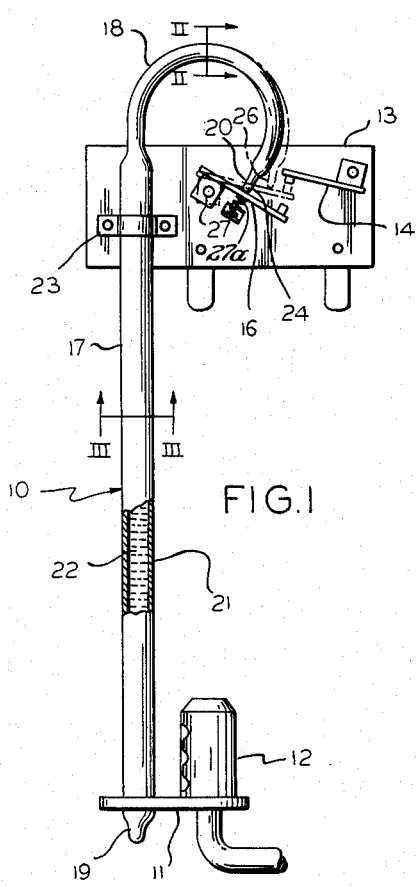
FIGURE 1 is a side elevational view of a temperature responsive control mechanism incorporating a heat indicating device constructed in accordance with the principles of the present invention and showing a portion of the device in section to illustrate the contents thereof.

Although the principles of the present invention are of utility in any heat indicating device a particularly useful application is made to control mechanisms, the operation of which is a function of temperature, and an illustrative embodiment of such a mechanism is illustrated in FIGURE 1 wherein a heat indicating device indicated generally at reference numeral 10 and constructed in accordance with the principles of the present invention is shown as being mounted at one end on a bracket 11, which also supports a gas pilot light assembly 12, and mounted at an opposite end on a bracket 13, which also supports a pair of relatively movable electrical contacts 14 and 16.

In the embodiment of FIGURE 1, the device 10 may be advantageously utilized to control the relative disposition of the electric contacts 14 and 16 in accordance with the temperature of the device as determined by the heat applied thereto by the pilot light assembly 12. The contacts 14 and 16 may be connected to a source of electric power through suitable electric circuitry (not shown), which may also include suitably electrically energizable apparatus, the operation of which is intended to be a function of the heat emanating from the pilot light assembly 12.

Figure 3:
FIGURE 3 is a cross-sectional view of a cylindrical body portion of the instant invention taken substantially along lines III—III of FIGURE 1.
Figure 2:
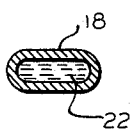
FIGURE 2 is a cross-sectional view of a curved portion of the heat indicating device of the present invention taken substantially along lines II—II of FIGURE 1.

The heat indicating device 10 is more particularly characterized as comprising a tubularly shaped straight elongated body portion 17 having a circular cross-section as illustrated in FIGURE 3, and a "pigtail" or curved portion 18 extending outwardly from an end of the body portion 17 and having a "flattened" or generally ellipsoidal cross-section as illustrated in FIGURE 2. A terminal end 19 of the body portion 17 is closed and sealed, and it will be noted that a distal terminal end 20 of the curved portion 18 is also sealed, thereby affording a completely enclosed and sealed container formed by the body portion 17 and the curved portion 18.

A side wall 21 of the device 10 is preferably constituted of material such as metal which is substantially inextensible in that it does not stretch in the manner of rubber or the like material, but is somewhat resilient in that once it is shaped to a given configuration it will tend to remain in this normal or free state configuration, and when urged slightly out of its free state configuration, will tend to return thereto upon the release of the deforming force.

The entire heat indicating element or device 10, including the body portion 17 and the curved portion 18 thereof, is filled with a thermally expansible material as indicated at 22 and which may constitute, for example, mercury, wax, ethylene glycol or the like substance. One property common to all of these materials is that the volume of the material increases substantially upon an increase in the temperature thereof and, if confined within a completely sealed container, will correspondingly substantially increase the internal pressure thereof.

It will be noted in FIGURE 1 that the body portion 17 of the heat indicating device 10 is firmly and immovably strapped or secured to the bracket member 13 by means of a clamp 23 or similar fastening device. The distal end portion 20 of the device is not connected to the bracket 13 in any wise and, in fact, the entire curved portion 18 is completely unrestricted insofar as external impediments to movement are concerned. In that sense, therefore, the end portion 20 of the device can properly be defined as "freely movable."

It will be appreciated that the curved portion 18 partakes of some of the characteristics of the conventional Bourdon-spring pressure gage in that it is comprised of a metallic tube, flattened in cross-section, and has one end thereof sealed tightly. Also, as the internal pressure within the curved portion 18 increases, the side wall 21 thereof tends to assume a more nearly circular cross-section and furthermore tends to straighten the tube from its normal or free state curved configuration.

It will be understood, however, that the instant invention significantly deviates from the conventional Bourdon tube in that, instead of having an open end of the curved tube connected to an external source of fluid pressure, whereby movement of the free end of the tube indicates a proportional change in fluid pressure, the curved portion 18 is instead unitarily or integrally connected to the sealed body portion 17 whereupon the entire device is completely filled with a thermally expansible material to provide a self-contained thermally responsive or heat indicating device instead of a fluid pressure gage which measures the pressure of an external source of fluid.

As noted, the body portion 17 is circular in cross-section and therefore the internal volume of the body portion can not be increased without actually stretching the side wall 21 thereof. On the other hand, the cross-section of the curved portion 18 is flattened and, although the side wall thereof is constituted of the same material as the side wall of the body portion 17, the internal volume of the curved portion can be increased without stretching the wall material by the deformation of the cross-sectional configuration thereof to one more nearly circular.

As will be apparent, an application of heat to the device 10 by means, for example, of the pilot light assembly 12 will, in turn, raise the temperature of the thermally expansible material 22 thereby raising the internal pressure of the device 10. The body portion 17 thereof, being circular in cross-section, will not deform due to an increase in internal pressure, but the curved portion 18 will tend to assume a more nearly circular cross-section and, simultaneously, will tend to straighten out with a corresponding movement of its tip or end portion 20 from its free state position, as indicated by the solid lines at 24, to a "deformed" state position as indicated by the broken lines at 26.

In the utilitarian embodiment of FIGURE 1, the electric contact 14 is immovably mounted on the bracket 13, and the contact 16 is mounted for pivotal movement on a pin 27 and is slightly pivotally biased toward contact 14 by means of any suitable biasing member such as an insulated compression spring as shown at 27a.

It will be apparent that, with proper relative disposition of parts, when the pilot light assembly or heat source 12 is operative the unsecured or free end 20 of the curved portion 18 will move to the position indicated by the broken lines at 26 and the electric contact 16, urged into abutting engagement with the end 20, will be pivotally moved into engagement with the contact 14, thereby closing the electric circuitry connected thereto to operate associated apparatus which may be connected thereto.

Figure 4:
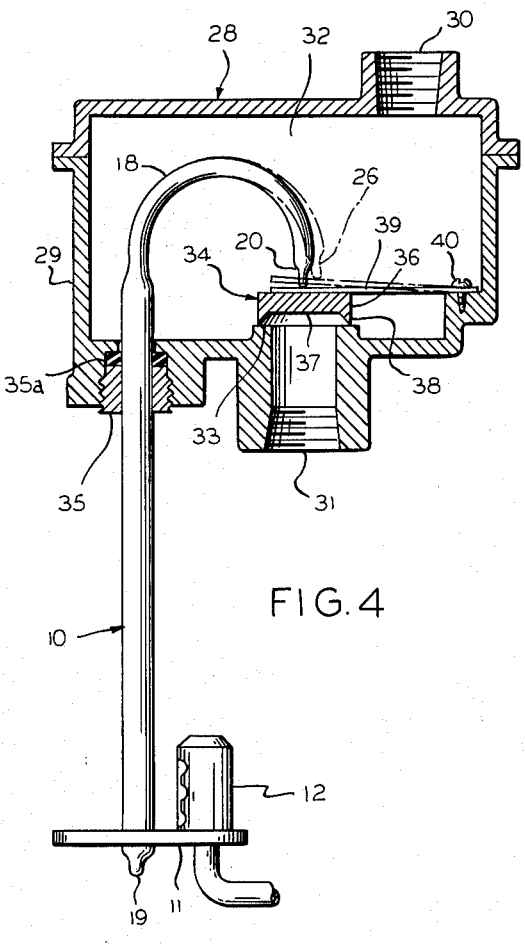
FIGURE 4 is similar to FIGURE 1 but illustrates another art association advantageously employing the heat indicating device of the present invention, namely a main gas burner valve assembly.

Referring to FIGURE 4, wherein parts similar to those illustrated in FIGURE 1 are indicated by like reference numerals, the heat indicating device 10 is illustrated in the art association of an automatic gas burner valve adapted to supply gas to a burner only during such periods as the main burner pilot flame assembly 12 is lighted.

As shown, an automatic gas burner valve 28 comprises a valve body 29 having a gas inlet 30, a gas outlet 31 and a chamber or passage 32 between the inlet and the outlet. The valve body 29 forms a valve seat 33 adjacent the outlet 31 and a gas control valve mechanism 34 is situated within the chamber 32 to cooperate with the valve seat 33 to control the flow of gas through the valve 28.

The valve mechanism 34 is more particularly characterized as comprising a poppet type valve body member 36 having formed on a lower face 37 thereof a peripheral wedge-shaped projection 38 adapted to abuttingly engage the valve seat 33 in leak-proof relation.

A somewhat flexible valve arm 39 is connected in fixed assembly at one end thereof to the valve body member 36 and at the other end thereof by means of a suitable fastener such as a screw 40, to the valve body 29.

The outer end of the valve arm 39, in a free or unstressed state, curved upwardly and is, therefore, normally biased in an upward direction as viewed in the drawings by means of its inherent resiliency, and the valve body member 36 is thereby normally situated in spaced relation with respect to the oalve seat 33 to establish flow of gas through the valve 28.

In the embodiment illustrated the heat indicating device extends into the valve body 29 through a plug 35 including a sealing element 35a, and the valve arm 39 is normally biased into abutting engagement with the free end 20 of the heat indicating device 10.

It will be apparent that during such periods as the pilot flame assembly 12 is lighted, the end 20 of the indicating device 10 will assume a position as indicated by the broken lines at 26, whereby the valve member 39 will assume an open position. Upon expiration of the pilot flame at 12, the free end or tip 20 will assume its free state configuration whereby the valve member 39 will be moved to its closed position, thereby interrupting the flow of gas through the gas valve 28. In this arrangement, the heat indicating device 10 operates as a safety control to permit flow of gas through the valve 28 to the main gas burner only during such times as the main burner pilot flame assembly 12 is lighted.

It will thus be preceived that the instant invention satisfies the objects set forth herein and has the additional advantages of being relatively inexpensive in manufacture, high in accuracy and particularly durable.

Although minor modifications might be suggested by those versed in the art, it should be understood that I wish to embody within the scope of the patent warranted hereon all such modifications as reasonably come within the scope of my contribution to the art.

I claim as my invention:

1. A gas burner safety valve comprising,
a valve body having a chamber formed therein,
an inlet port for connection to a source of gas and an outlet port for connection to a gas burner formed in said body and in communication with each other through said chamber,
means on said body forming a valve seat surrounding said outlet port and facing said chamber,
a poppet valve within said chamber,
means mounting said poppet valve within said chamber for movement between a closed position whereby said poppet valve engages said valve seat to close said outlet port and an open position whereby said poppet valve disengages said valve seat to open said outlet port,
    said mounting means biasing said poppet valve to one of said positions,
a hollow, sealed, generally tubularly-shaped container having an enclosure wall constituted of somewhat resilient material and comprising a body portion of circular cross-section extending through said valve body and a curved portion of ellipsoidal cross-section situated within said chamber and having a distal end portion thereof engageable with said poppet valve, and a thermally expansible material filling said container and said body portion of said container outside of said chamber being adapted to be situated adjacent a pilot flame in order to be heated thereby,
    said curved portion of said container having a given curvature when the pilot flame is lighted whereby the distal end in engagement with said poppet valve enables said outlet port to be opened, and said curved portion having a curvature greater than said given curvature when the pilot flame is out whereby the distal end thereof moves said poppet valve to close said outlet port.

2. A gas burner safety valve comprising,
a valve body having a chamber formed therein,
an inlet port for connection to a source of gas and an outlet port for connection to a gas burner formed in said body and in communication with each other through said chamber,
means on said body forming a valve seat surrounding said outlet port and facing said chamber,
a poppet valve within said chamber,
means mounting said poppet valve within said chamber for movement between a closed position whereby said poppet valve engages said valve seat to close said outlet port and an open position whereby said poppet valve disengages said valve seat to open said outlet port,
    said mounting means biasing said poppet valve to said open position thereof,
a hollow, sealed, generally tubularly-shaped container having an enclosure wall constituted of somewhat resilient material and comprising a body portion of circular cross-section extending through said valve body and a curved portion of ellipsoidal cross-section situated within said chamber and having a distal end portion thereof engageable with said poppet valve, and a thermally expansible material filling said container and said body portion of said container outside of said chamber being adapted to be situated adjacent a pilot flame in order to be heated thereby,
    said curved portion of said container having a given curvature when the pilot flame is lighted whereby the distal end in engagement with said poppet valve enables said outlet port to be opened, and
    said curved portion having a curvature greater than said given curvature when the pilot flame is out whereby the distal end thereof moves said poppet valve to close said outlet port.

References Cited by the Examiner

UNITED STATES PATENTS

| | | | |
|---|---|---|---|
| 326,155 | 9/1885 | Rider | 73—368.6 X |
| 811,483 | 1/1906 | Clements et al. | 236—42 |
| 1,308,856 | 7/1919 | Morgan | 236—57 |
| 1,655,384 | 1/1928 | Bonerz | 200—67 |
| 1,785,699 | 12/1930 | Litle | 200—81.8 X |
| 1,849,481 | 3/1932 | Langie et al. | 73—368.6 X |
| 1,977,570 | 10/1934 | Blodgett | 236—34 |
| 2,185,422 | 1/1940 | Prutton et al. | 236—99 |
| 3,117,620 | 1/1964 | Fuller | 236—68 X |
| 3,132,518 | 5/1964 | Salmon | 73—368.2 |
| 3,163,045 | 12/1964 | Kaveckas et al. | 73—368 X |

OTHER REFERENCES

German printed application 1,054,353, April 1959.

ALDEN D. STEWART, *Primary Examiner.*